(12) United States Patent
Yoshihara et al.

(10) Patent No.: US 11,123,815 B2
(45) Date of Patent: Sep. 21, 2021

(54) SEAM WELDING METHOD FOR VEHICLE DOOR SASH

(71) Applicant: SHIROKI CORPORATION, Fujisawa (JP)

(72) Inventors: Jiro Yoshihara, Chiryu (JP); Koji Yoshida, Anjo (JP); Toshifumi Yanai, Aichi-ken (JP)

(73) Assignee: SHIROKI CORPORATION, Fujisawa (JP)

( * ) Notice: Subject to any disclaimer, the term of this patent is extended or adjusted under 35 U.S.C. 154(b) by 437 days.

(21) Appl. No.: 16/169,142

(22) Filed: Oct. 24, 2018

(65) Prior Publication Data

US 2019/0126383 A1    May 2, 2019

(30) Foreign Application Priority Data

Oct. 27, 2017  (JP) .............................. JP2017-208592

(51) Int. Cl.
*B23K 11/06* (2006.01)
*B23K 11/00* (2006.01)
(Continued)

(52) U.S. Cl.
CPC ........ *B23K 11/063* (2013.01); *B23K 11/0026* (2013.01); *B23K 2101/006* (2018.08); *B60J 5/0402* (2013.01)

(58) Field of Classification Search
CPC ... B23K 11/063; B23K 11/3036; B23K 11/06; B23K 11/0026; B23K 2101/006; B60J 5/0402
(Continued)

(56) References Cited

U.S. PATENT DOCUMENTS 1,676,656 A * 7/1928 Lutz ..................... B23K 35/222
                                            219/84
1,738,465 A * 12/1929 Wagner ............... B23K 11/061
                                            219/82
(Continued)

FOREIGN PATENT DOCUMENTS

CN       102198562 A    9/2011
CN       102416524 A    4/2012
(Continued)

OTHER PUBLICATIONS

Office Action (First Office Action) dated Jun. 24, 2021, by the State Intellectual Property Office of People's Republic of China in corresponding Chinese Patent Application No. 201811238041.9 and an English Translation of the Office Action. (12 pages).

(Continued)

*Primary Examiner* — Eric S Stapleton
(74) *Attorney, Agent, or Firm* — Buchanan Ingersoll & Rooney PC

(57) ABSTRACT

Seam welding is performed by clamping a coupling portion of an upper sash with a first roller electrode and a second roller electrode, and applying electricity while rotating first roller electrode and the second roller electrode. The first roller electrode includes a plurality of first projecting portions and second projecting portions that are at intervals in a circumferential direction around a first rotational center. The second roller electrode may include a plurality of first opposing projecting portions and second opposing projecting portions that are at intervals in a circumferential direction around a second rotational center, by clamping a coupling portion of an upper sash and applying electricity while rotating.

3 Claims, 10 Drawing Sheets

(51) Int. Cl.
*B60J 5/04* (2006.01)
*B23K 101/00* (2006.01)

(58) Field of Classification Search
USPC .......................................................... 219/82
See application file for complete search history.

(56) References Cited

U.S. PATENT DOCUMENTS

| | | | | |
|---|---|---|---|---|
| 1,965,521 A * | 7/1934 | Cutter | B23K 11/06 | 219/81 |
| 2,056,192 A * | 10/1936 | Hothersall | B21D 51/2646 | 228/160 |
| 2,187,740 A * | 1/1940 | Hothersall | B23K 11/063 | 219/64 |
| 2,323,316 A * | 7/1943 | Dieter | B63B 3/14 | 52/518 |
| 2,613,015 A * | 10/1952 | Keating | B21D 51/00 | 220/567.3 |
| 2,684,424 A * | 7/1954 | Anderson | B23K 11/06 | 219/81 |
| 2,774,858 A * | 12/1956 | Heilshorn | B23K 11/06 | 219/78.16 |
| 3,175,071 A * | 3/1965 | Fisher | B23K 11/06 | 219/81 |
| 3,293,403 A * | 12/1966 | Rudd | B23K 11/0873 | 219/104 |
| 3,313,911 A * | 4/1967 | Seelofff | B23K 11/061 | 219/105 |
| 3,315,436 A * | 4/1967 | Mosetich | B65B 15/04 | 53/399 |
| 3,420,976 A * | 1/1969 | Yuter | B23K 13/043 | 219/102 |
| 3,504,427 A * | 4/1970 | Seeloff | B23K 11/061 | 228/154 |
| 3,649,800 A * | 3/1972 | Happel | B23K 11/30 | 219/64 |
| 3,761,671 A * | 9/1973 | Erlandson | B23K 11/24 | 219/64 |
| 3,811,028 A * | 5/1974 | Henry | B23K 11/20 | 219/78.02 |
| 3,818,172 A * | 6/1974 | Larsson | B23K 11/061 | 219/82 |
| 4,144,440 A * | 3/1979 | Schalch | B23K 11/253 | 219/111 |
| 4,145,986 A * | 3/1979 | Bauer | B23K 11/063 | 219/64 |
| 4,160,892 A * | 7/1979 | Opprecht | B23K 11/063 | 219/83 |
| 4,223,196 A * | 9/1980 | Erlandson | B23K 13/046 | 219/61.2 |
| 4,395,614 A * | 7/1983 | Weil | B23K 11/06 | 219/72 |
| 4,457,111 A * | 7/1984 | Koike | B60J 10/248 | 296/146.3 |
| 4,493,962 A * | 1/1985 | Weil | B23K 9/007 | 219/64 |
| 4,532,399 A * | 7/1985 | Jones | B23K 11/06 | 219/114 |
| 4,652,715 A * | 3/1987 | Kitamura | B23K 35/0205 | 219/64 |
| 4,652,720 A * | 3/1987 | Opprecht | B23K 11/11 | 219/82 |
| 4,712,960 A * | 12/1987 | Opprecht | B23K 11/0033 | 413/74 |
| 4,728,766 A * | 3/1988 | Opprecht | B21D 43/023 | 219/79 |
| 4,732,026 A * | 3/1988 | Ban | B21D 51/2676 | 219/64 |
| 4,795,295 A * | 1/1989 | Opprecht | B21D 51/383 | 413/1 |
| 4,795,875 A * | 1/1989 | Urech | B23K 35/0205 | 219/84 |
| 4,865,243 A * | 9/1989 | Meier | B23K 11/063 | 228/15.1 |
| 4,879,445 A * | 11/1989 | Kawano | B23K 11/063 | 219/64 |
| 5,120,177 A * | 6/1992 | Stieger | B21D 51/2676 | 413/72 |
| 5,131,581 A * | 7/1992 | Geiermann | B23K 11/061 | 219/79 |
| 5,140,715 A * | 8/1992 | Monacelli | B21G 3/12 | 470/128 |
| 5,157,010 A * | 10/1992 | Maus | B01J 35/04 | 502/439 |
| 5,249,725 A * | 10/1993 | Nakatsu | B23K 11/309 | 228/5.5 |
| 5,343,010 A * | 8/1994 | Urech | B23K 26/26 | 219/83 |
| 5,347,758 A * | 9/1994 | Yamane | B60J 10/24 | 49/484.1 |
| 5,622,637 A * | 4/1997 | Taiana | B23K 11/063 | 219/64 |
| 5,676,862 A * | 10/1997 | Matteson | B23K 11/063 | 219/110 |
| 5,726,410 A * | 3/1998 | Fukushima | B23K 11/061 | 219/117.1 |
| 5,735,081 A * | 4/1998 | Yamanaka | B60J 5/0402 | 29/897.2 |
| 5,841,094 A * | 11/1998 | Baumgartner | B23K 11/257 | 219/81 |
| 5,951,885 A * | 9/1999 | Takahashi | B23K 33/00 | 219/83 |
| 5,977,511 A * | 11/1999 | Meier | B23K 26/26 | 219/121.63 |
| 5,983,571 A * | 11/1999 | Takeda | B21D 5/083 | 49/502 |
| 5,992,021 A * | 11/1999 | Takeda | B60J 5/0402 | 29/897.2 |
| 6,098,869 A * | 8/2000 | Bonsen | B23K 11/063 | 228/147 |
| 6,112,470 A * | 9/2000 | Hashimoto | B60J 5/0402 | 49/502 |
| 6,281,467 B1 * | 8/2001 | Gould | B23K 11/063 | 219/118 |
| 6,452,128 B1 * | 9/2002 | Muller | B23K 11/063 | 219/64 |
| 6,579,626 B1 * | 6/2003 | Ottinger | B23K 11/02 | 428/626 |
| 6,770,834 B1 * | 8/2004 | Deshotel | B23K 9/32 | 219/78.16 |
| 6,840,565 B2 * | 1/2005 | Masunaga | B60J 5/0402 | 296/146.5 |
| 7,718,917 B2 * | 5/2010 | Wang | B23K 28/02 | 219/91.2 |
| 7,762,021 B2 * | 7/2010 | Fujiwara | B60R 13/04 | 49/502 |
| 9,085,220 B2 * | 7/2015 | Yoshihara | B23P 15/00 | |
| 2002/0011466 A1* | 1/2002 | Muller | B23K 11/063 | 219/64 |
| 2002/0027378 A1* | 3/2002 | Nozaki | B60J 10/30 | 296/146.9 |
| 2002/0108313 A1* | 8/2002 | Nozaki | B60J 10/16 | 49/441 |
| 2003/0010757 A1* | 1/2003 | Yoneya | B23K 37/047 | 219/83 |
| 2004/0197135 A1* | 10/2004 | Wang | B23K 11/06 | 403/270 |
| 2004/0255928 A1* | 12/2004 | Deubzer | F24C 15/08 | 126/273 R |
| 2005/0230361 A1* | 10/2005 | Wang | B23K 11/06 | 219/117.1 |
| 2006/0124604 A1* | 6/2006 | Miyamoto | B23K 11/061 | 219/81 |
| 2006/0144900 A1* | 7/2006 | Hirth | B23K 11/06 | 228/30 |
| 2006/0150388 A1* | 7/2006 | Inada | B23K 11/084 | 29/516 |

(56) References Cited

U.S. PATENT DOCUMENTS

| | | | | |
|---|---|---|---|---|
| 2006/0162258 A1* | 7/2006 | Yamashita | ............... | B60J 10/86 49/495.1 |
| 2007/0007254 A1* | 1/2007 | Wang | ............... | B23K 28/02 219/91.22 |
| 2007/0262607 A1* | 11/2007 | Saito | ............... | B60J 10/87 296/146.2 |
| 2007/0262608 A1* | 11/2007 | Saito | ............... | B60J 10/248 296/146.7 |
| 2008/0178531 A1* | 7/2008 | Takeuchi | ............... | B60J 1/17 49/475.1 |
| 2009/0115220 A1* | 5/2009 | Takeuchi | ............... | B60J 10/86 296/146.6 |
| 2009/0195013 A1* | 8/2009 | Suzuki | ............... | B60R 13/04 296/146.5 |
| 2010/0115851 A1* | 5/2010 | Nakao | ............... | B60R 13/04 49/502 |
| 2010/0272542 A1* | 10/2010 | Mueller | ............... | B23K 11/25 413/1 |
| 2011/0099911 A1* | 5/2011 | Ellis | ............... | B60J 5/0402 49/493.1 |
| 2011/0099912 A1* | 5/2011 | Ohtake | ............... | B60J 10/21 49/502 |
| 2011/0120979 A1* | 5/2011 | Kaga | ............... | B23K 11/36 219/102 |
| 2011/0163074 A1* | 7/2011 | Kaga | ............... | B23K 11/087 219/83 |
| 2011/0233173 A1 | 9/2011 | Kaneko et al. | | |
| 2012/0074103 A1* | 3/2012 | Hasegawa | ............... | B23K 11/061 219/102 |
| 2012/0192498 A1* | 8/2012 | Fukui | ............... | B60J 5/00 49/504 |
| 2013/0168365 A1* | 7/2013 | Kaga | ............... | B23K 11/061 219/78.16 |
| 2014/0042772 A1* | 2/2014 | Ohsawa | ............... | B60J 5/0402 296/146.5 |
| 2014/0059942 A1* | 3/2014 | Goto | ............... | B60J 1/2047 49/502 |
| 2014/0117707 A1* | 5/2014 | Yamada | ............... | B21D 19/08 296/146.9 |
| 2014/0132028 A1* | 5/2014 | Yamada | ............... | B23K 26/244 296/146.2 |
| 2014/0157602 A1* | 6/2014 | Fukui | ............... | B60J 5/0463 29/897.2 |
| 2014/0159431 A1* | 6/2014 | Yoshihara | ............... | B60J 5/0402 296/202 |
| 2014/0246878 A1* | 9/2014 | Shimizu | ............... | B60J 5/0402 296/146.2 |
| 2016/0207138 A1 | 7/2016 | Ikeda et al. | | |
| 2017/0305246 A1* | 10/2017 | Noguchi | ............... | B60J 10/30 |

FOREIGN PATENT DOCUMENTS

| | | |
|---|---|---|
| CN | 103648812 A | 3/2014 |
| CN | 204449601 U | 7/2015 |
| CN | 105517746 A | 4/2016 |
| JP | H03-120986 U | 12/1991 |
| JP | 2013-018409 A | 1/2013 |
| SU | 500940 A1 | 1/1976 |

OTHER PUBLICATIONS

Office Action (Notice of Reasons for Refusal) dated Aug. 3, 2021, by the Japanese Patent Office in corresponding Japanese Patent Application No. 2017-208592 and an English Translation of the Office Action (6 pages).

* cited by examiner

SEAM WELDING METHOD FOR VEHICLE DOOR SASH

CROSS-REFERENCE TO RELATED APPLICATIONS

This application is based upon and claims the benefit of priority from Japanese Patent Application No. 2017-208592, filed on Oct. 27, 2017, the entire contents of which are incorporated herein by reference.

FIELD

An embodiment described herein relates generally to a seam welding method for a vehicle door sash.

BACKGROUND

Conventionally, there have been door sashes for which a welding target portion where a plurality of metal sheets are overlapped is joined by seam welding. In such a door sash, the welding target portion is joined by seam welding that is continuous along the longitudinal direction (for example, Japanese Laid-open Patent Publication No. 2013-18409).

However, there has been a concern that, because welding heat accumulates at the welding target portion when performing the continuous seam welding, the dimension of the door sash may be varied by distortion due to the welding heat.

Thus, a problem to be solved by the present invention is to obtain a novel seam welding method for a vehicle door sash capable of reducing the distortion due to the welding heat, for example.

SUMMARY

In general, according to one embodiment, a seam welding method is for a vehicle door sash. The seam welding method includes performing seam welding by applying electricity between a first roller electrode and a second roller electrode in a state where a welding target portion is clamped by the first roller electrode and the second roller electrode rotating in conjunction with the first roller electrode. The welding target portion includes a plurality of overlapped metal sheets out of regions of the vehicle door sash. The first roller electrode includes a first row of a plurality of first projecting portions that are arranged at intervals in a circumferential direction around a first rotational center and a second row of a plurality of second projecting portions that are in locations shifted toward one side in an axial direction of the first rotational center from the first row and arranged at intervals in the circumferential direction around the first rotational center.

DETAILED DESCRIPTION

The following discloses an exemplary embodiment of the present invention. The configurations in the following embodiment disclosed, as well as the operations and results (effects) that are brought about by such configurations, are one example. The invention can also be implemented by configurations other than those disclosed in the following embodiment. Furthermore, according to the invention, it is possible to obtain at least one of various effects obtainable (including derivative effects) by the configurations.

In the respective drawings, directions are indicated for the sake of convenience. FR indicates the front in the vehicle front-and-rear direction, RR indicates the rear in the vehicle front-and-rear direction, UPR indicates the upper side in the up-and-down direction of the vehicle, LWR indicates the lower side in the up-and-down direction of the vehicle, OUT indicates the outer side of the vehicle (outer side in the vehicle width direction), and IN indicates the inner side of the vehicle (inner side in the vehicle width direction).

Figure 1:
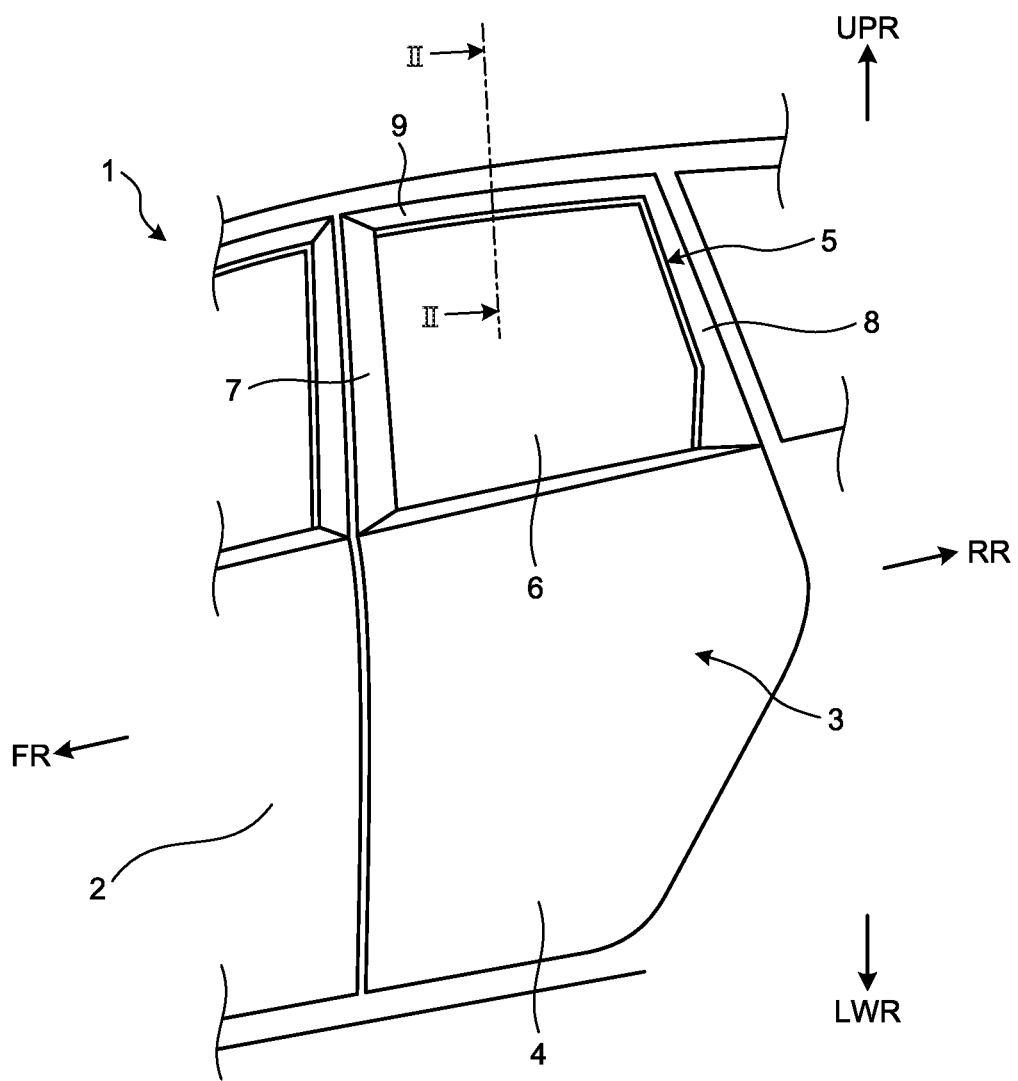
FIG. 1 is a side view of a vehicle according to an embodiment viewed from a lateral side.

FIG. 1 is a side view of a vehicle in the present embodiment viewed from a lateral side. As illustrated in FIG. 1, in the left-side portion of a vehicle 1, a front door 2 is provided on the front and a rear door 3 is provided on the rear side of the front door 2. The rear door 3 includes a door panel 4 provided on the lower side, a door frame 5 provided on the upper side of the door panel 4, and a door glass 6 that is retained by the door panel 4 and capable of moving up and down.

The door frame 5 includes a front side sash 7 extending upward from the front end in the upper end of the door panel 4, a rear side sash 8 extending upward from the rear end in the upper end of the door panel 4, and an upper sash 9 coupling the upper ends of the front side sash 7 and the rear side sash 8 in the vehicle front-and-rear direction. The upper sash 9 is one example of a door sash.

Figure 2:
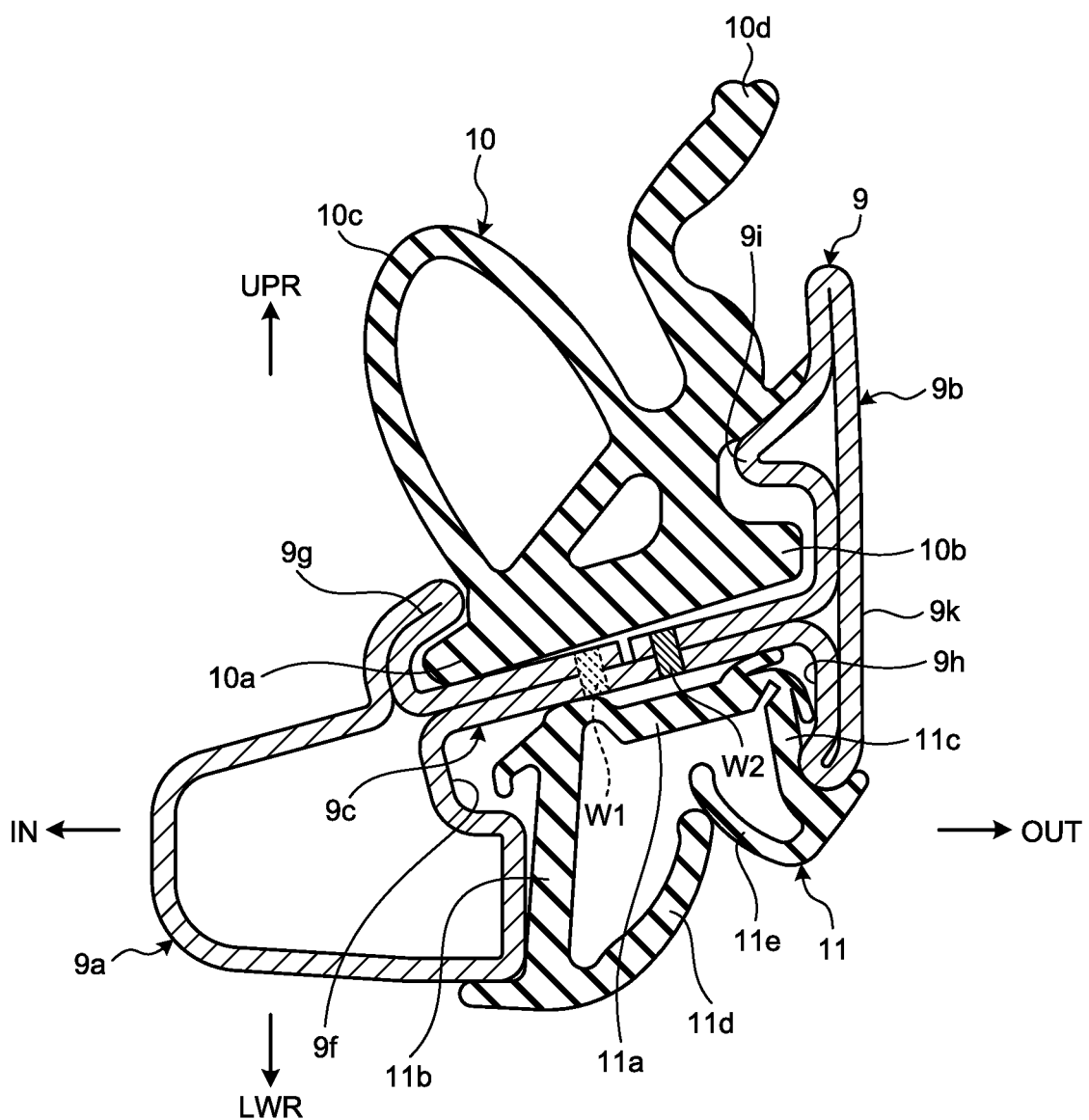
FIG. 2 is a cross-sectional view taken along the line II-II of FIG. 1.
Figure 3:
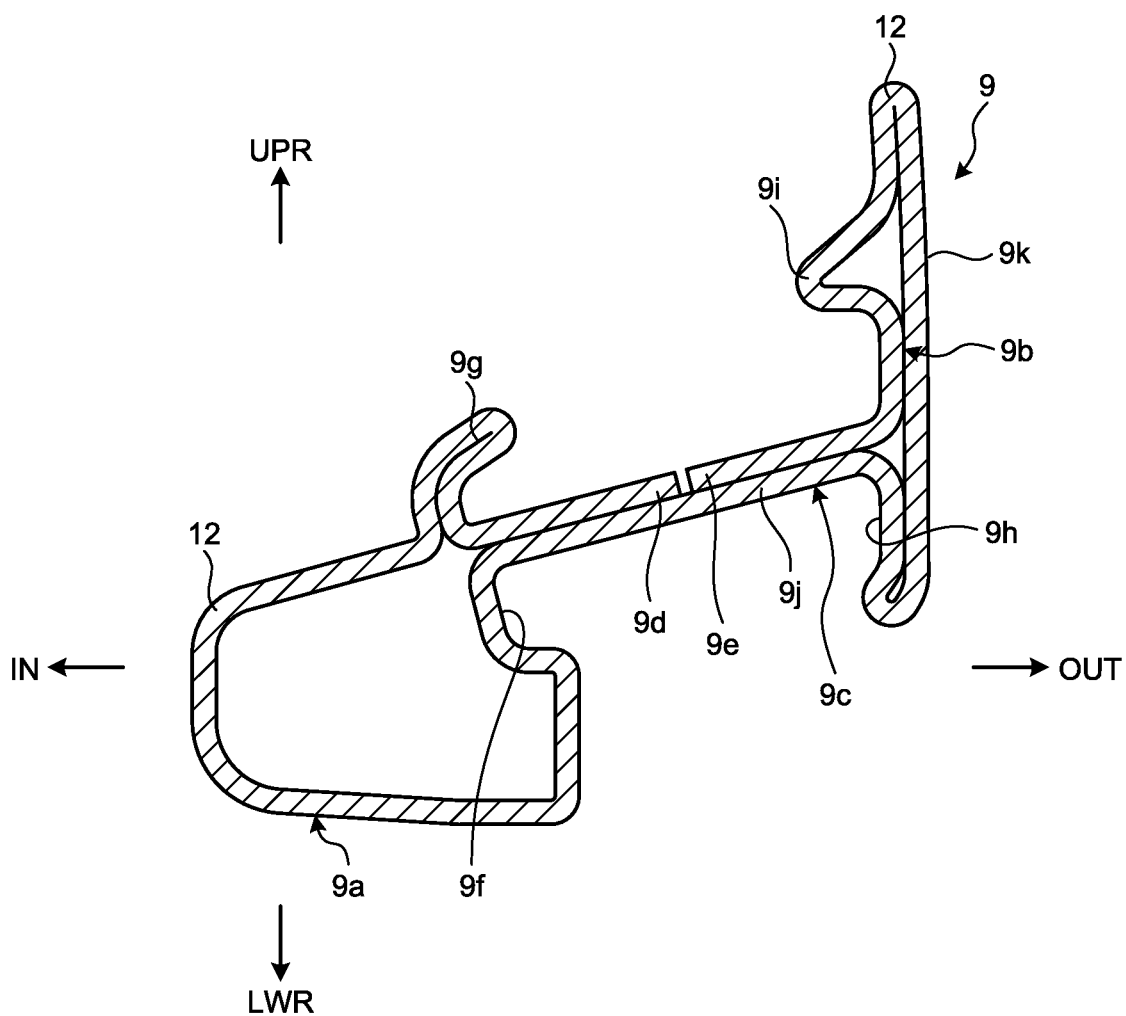
FIG. 3 is a cross-sectional view for which a weather strip, a glass run, and a welded portion are omitted from FIG. 2.

FIG. 2 is a cross-sectional view taken along the line II-II of FIG. 1. FIG. 3 is a cross-sectional view for which a weather strip 10, a glass run 11, and a welded portion are omitted from FIG. 2.

As illustrated in FIG. 2, on the upper side of the upper sash 9, the weather strip 10 extending along the vehicle front-and-rear direction is retained, and on the lower side of the upper sash 9, the glass run 11 extending along the vehicle front-and-rear direction is retained. The weather strip 10 is formed of an elastic member, for example, rubber. On the inner side of the vehicle (inner side in the vehicle width direction) in the lower portion of the weather strip 10, an inside protrusion portion 10a is projecting toward the inner side of the vehicle, and on the outer side of the vehicle (outer side in the vehicle width direction) in the lower portion of the weather strip 10, an outside protrusion portion 10b is projecting toward the outer side of the vehicle. The inside protrusion portion 10a of the weather strip 10 is retained by an inner-side retaining portion 9g of the upper sash 9, which will be described later, and the outside protrusion portion 10b of the weather strip 10 is retained by an outer-side retaining portion 9i of the upper sash 9, which will be described later. On the inner side of the vehicle (inner side in the vehicle width direction) in the upper portion of the weather strip 10, a bulging portion 10c extending toward the upper side of the vehicle is provided, and on the outer side of the vehicle (outer side in the vehicle width direction) in the upper portion of the weather strip 10, a projecting piece 10d extending toward the upper side of the vehicle is provided. When the rear door 3 is closed, the bulging portion 10c and the projecting piece 10d are pressed to a body panel, thereby maintaining the liquid-tightness between the rear door 3 and the body panel.

The glass run 11 includes a base portion 11a provided in the upper portion, an inside leg portion 11b extending toward the lower side from the inner side of the vehicle of the base portion 11a, an outside leg portion 11c extending toward the lower side from the outer side of the vehicle of the base portion 11a, and a pair of lips 11d and 11e provided at the lower ends of the inside leg portion 11b and the outside leg portion 11c. The distal ends of the pair of lips 11d and 11e come in contact with the front surface and the back surface of the door glass 6, thereby maintaining the liquid-tightness between the door glass 6 and the upper sash 9. The glass run 11 is retained by an inside retaining portion 9f and an outside retaining portion 9h of the upper sash 9, which will be described later.

As illustrated in FIGS. 2 and 3, the upper sash 9 is provided with a tubular portion 9a, a design portion 9b, and a coupling portion 9c. The tubular portion 9a, the design portion 9b, and the coupling portion 9c are made up of, to be connected to one another, a single metal sheet that is bent at a plurality of linear bent portions 12 along the vehicle front-and-rear direction between a first end portion 9d and a second end portion 9e in the vehicle width direction extending along the vehicle front-and-rear direction. Specifically, the following describes that.

The tubular portion 9a is located on the inner side of the vehicle (inner side in the vehicle width direction), is a closed cross-sectional portion constituting a hollow portion, and is extending along the vehicle front-and-rear direction. In the upper portion on the outer side of the vehicle (outer side in the vehicle width direction) of the tubular portion 9a, a recessed portion that is recessed to face toward the outer side direction of the vehicle is provided, and the recessed portion is configured as the inside retaining portion 9f that retains the glass run 11. In the upper portion on the inner side of the vehicle of the tubular portion 9a, the inner-side retaining portion 9g that retains the weather strip 10 is provided. The tubular portion 9a is made up of the metal sheet bending at the linear bent portions 12. The vehicle front-and-rear direction is one example of a longitudinal direction. The vehicle width direction is one example of a lateral direction.

The design portion 9b is located away from the tubular portion 9a on the outer side of the vehicle and is extending along the vehicle front-and-rear direction. The design portion 9b is of a two-ply structure of the metal sheet on the inner side of the vehicle and the metal sheet on the outer side of the vehicle. The surface on the outer side of the vehicle in the metal sheet on the outer side of the vehicle is a design surface 9k. On the metal sheet on the inner side of the vehicle in the lower portion of the design portion 9b, the outside retaining portion 9h is provided, and on the metal sheet on the inner side of the vehicle in the upper portion of the design portion 9b, the outer-side retaining portion 9i is provided. The design portion 9b is made up by bending at the linear bent portions 12.

As illustrated in FIG. 3, the coupling portion 9c couples the tubular portion 9a and the design portion 9b in the vehicle width direction intersecting with the vehicle front-and-rear direction and extends along the vehicle front-and-rear direction. The coupling portion 9c is made up of a metal sheet 201 arranged on the lower side (see FIG. 6) and a metal sheet 201 arranged on the upper side (see FIG. 6) in such a manner that the two metal sheets are overlapped. As in the foregoing, the upper sash 9 is made up of a single metal sheet 201 bending at the bent portions 12 between the first end portion 9d and the second end portion 9e in the vehicle width direction. Accordingly, in the coupling portion 9c, the metal sheet 201 arranged on the lower side is an intermediate portion 9j of the metal sheet bridged between the tubular portion 9a and the design portion 9b, and the metal sheet 201 arranged on the upper side includes the first end portion 9d that is overlapped with the intermediate portion 9j in the thickness direction of metal sheet and is welded with the intermediate portion 9j and the second end portion 9e that is overlapped with the intermediate portion 9j in the thickness direction, welded with the intermediate portion 9j, and facing the first end portion 9d while leaving a gap 14. That is, the coupling portion 9c is a welding target portion including a plurality of overlapped metal sheets out of regions of a vehicle door sash.

Figure 4:
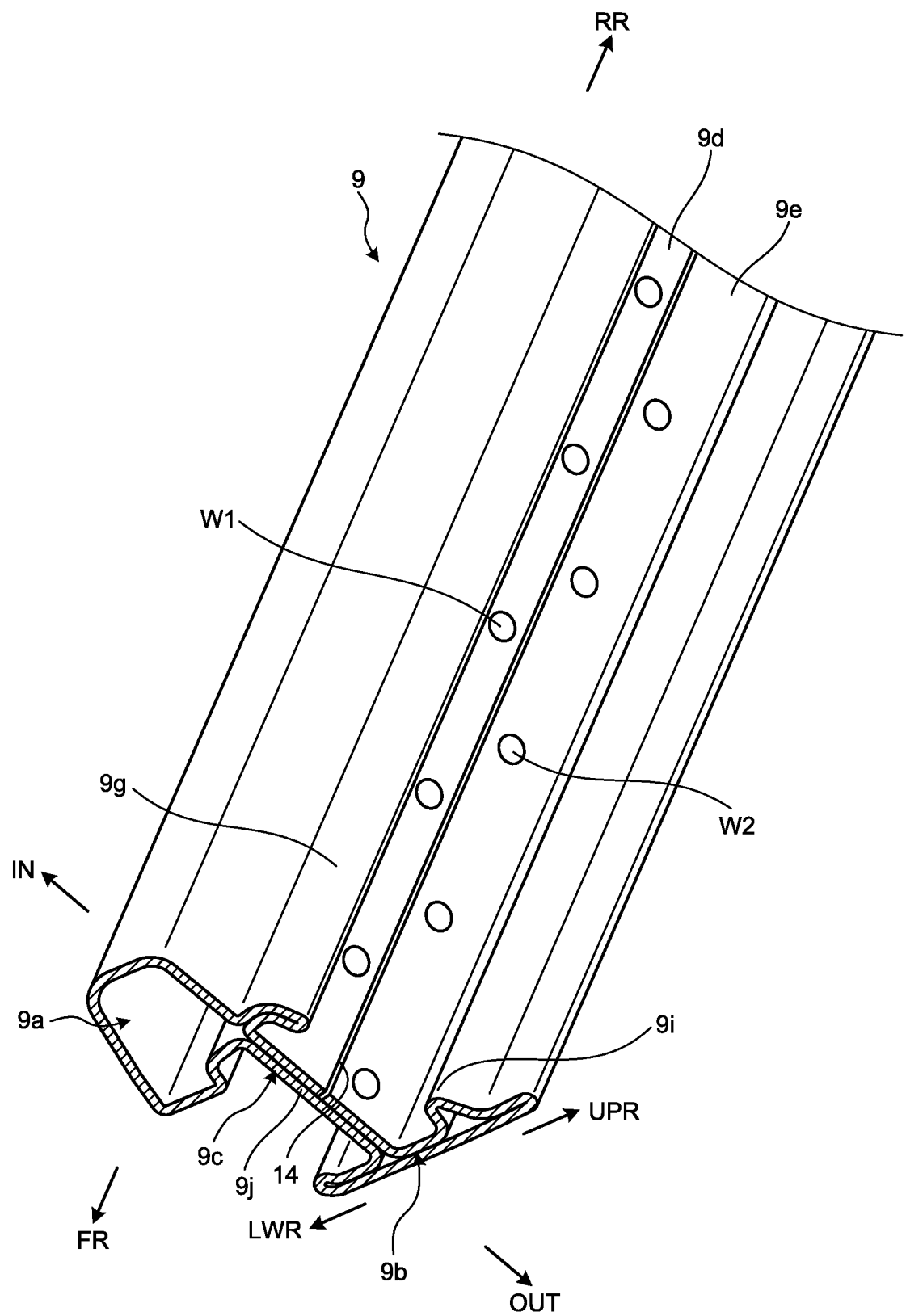
FIG. 4 is a perspective view of an upper sash of FIG. 3.
Figure 5:
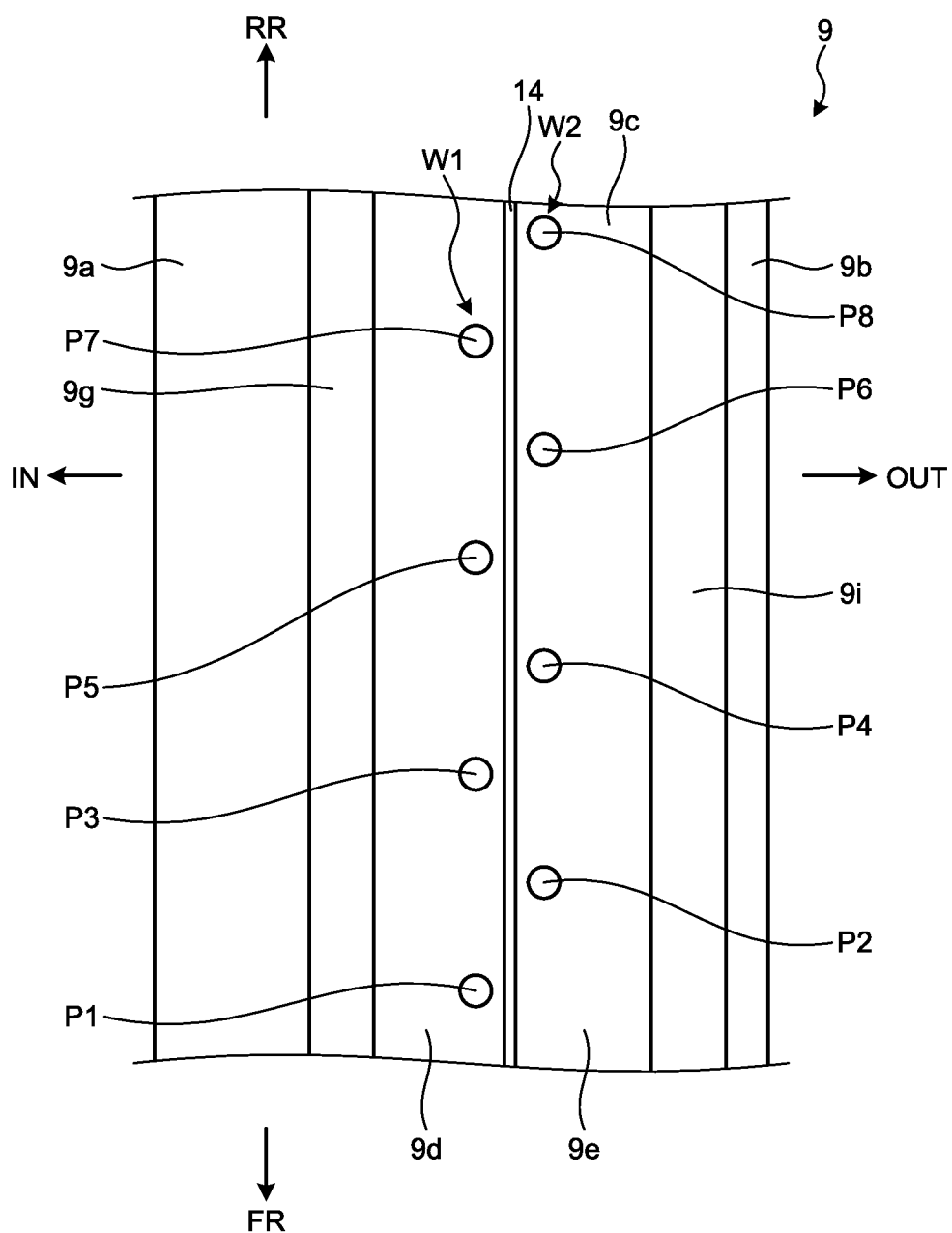
FIG. 5 is a plan view of the upper sash of FIG. 4 viewed from the above.

FIG. 4 is a perspective view of the upper sash 9 of FIG. 3. FIG. 5 is a plan view of the upper sash 9 of FIG. 4 viewed from the above.

As illustrated in FIGS. 4 and 5, the intermediate portion 9j and the first end portion 9d are welded at a plurality of first welding points W1 disposed at intervals in the vehicle front-and-rear direction. In the present embodiment, the first welding points W1 scattered in the vehicle front-and-rear direction are disposed at equal intervals. The intermediate portion 9j and the second end portion 9e are welded at a plurality of second welding points W2 disposed at intervals in the vehicle front-and-rear direction. In the present embodiment, the second welding points W2 scattered in the vehicle front-and-rear direction are disposed at equal intervals. The first welding points W1 and the second welding points W2 are disposed alternately along the vehicle front-and-rear direction. That is, when viewed in the vehicle front-and-rear direction, between the first welding points W1 adjacent in the vehicle front-and-rear direction, the second welding point W2 is disposed.

Next, the structure of a seam welding line 100 that performs seam welding on the upper sash 9 and the procedure of the seam welding will briefly be described.

Figure 6:
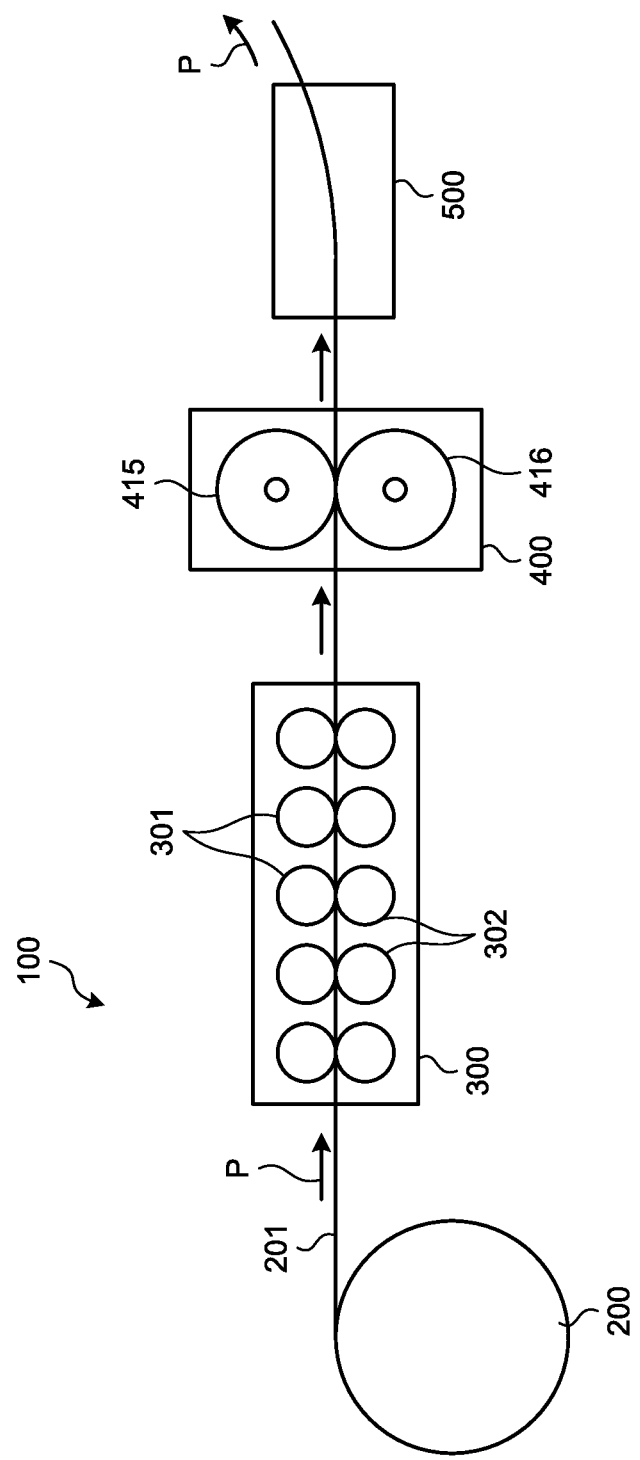
FIG. 6 is a schematic and exemplary view illustrating a seam welding line in the embodiment.
Figure 7:
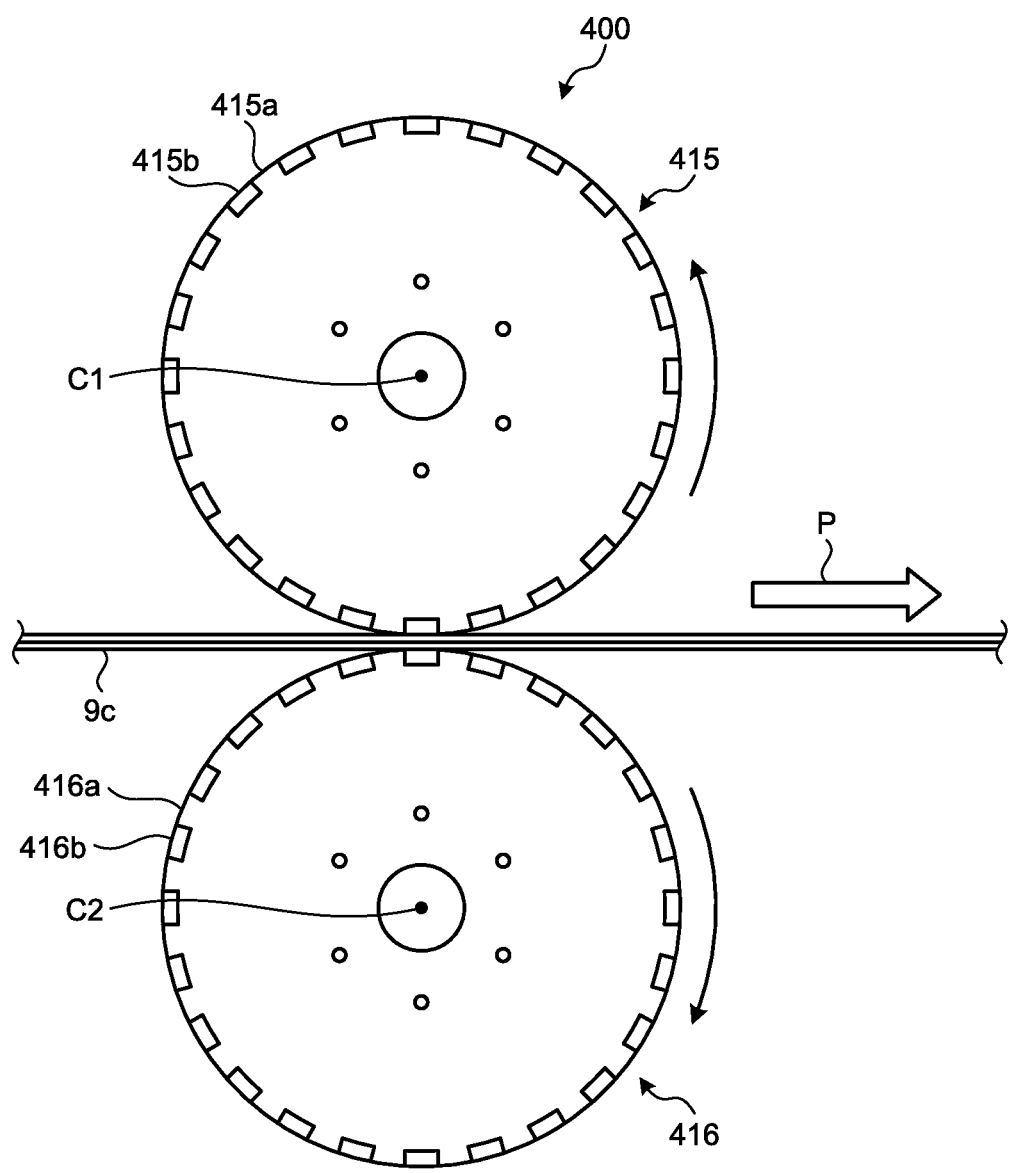
FIG. 7 is a schematic and exemplary view illustrating a state where seam welding is performed on a coupling portion of the upper sash.
Figure 8:
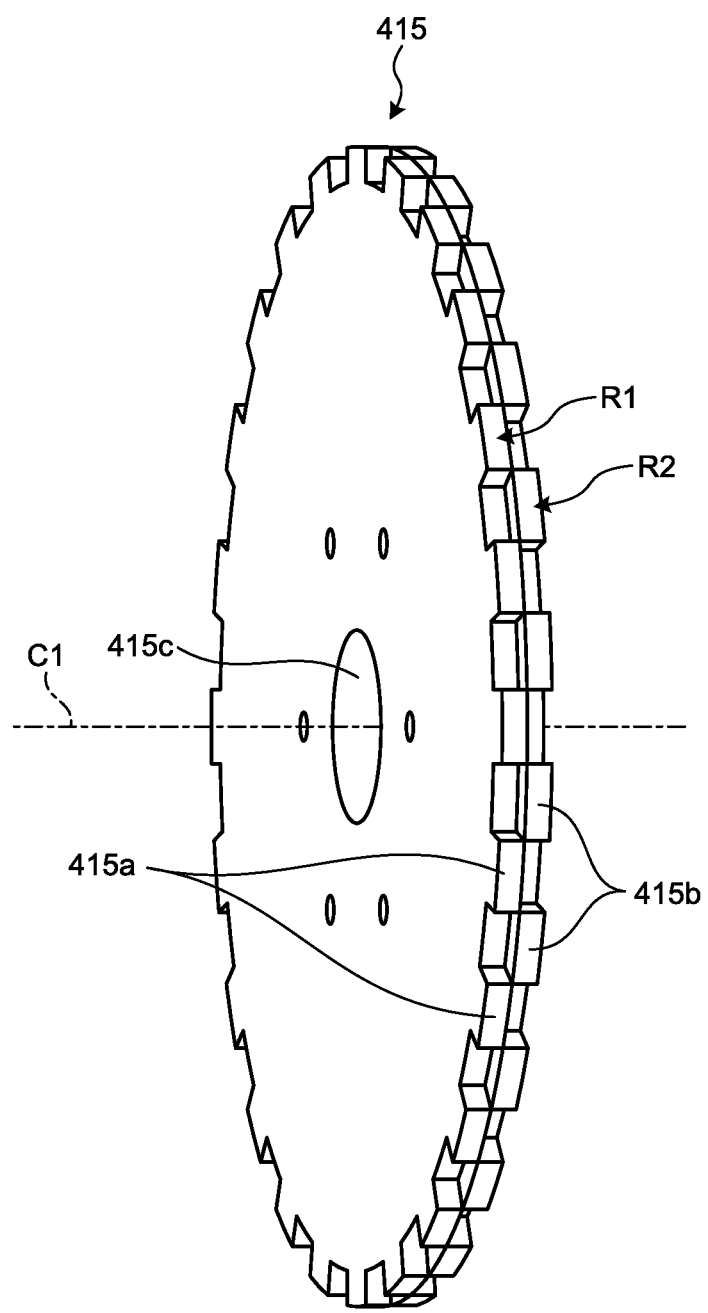
FIG. 8 is a perspective view illustrating a first roller electrode of FIG. 7.
Figure 9:
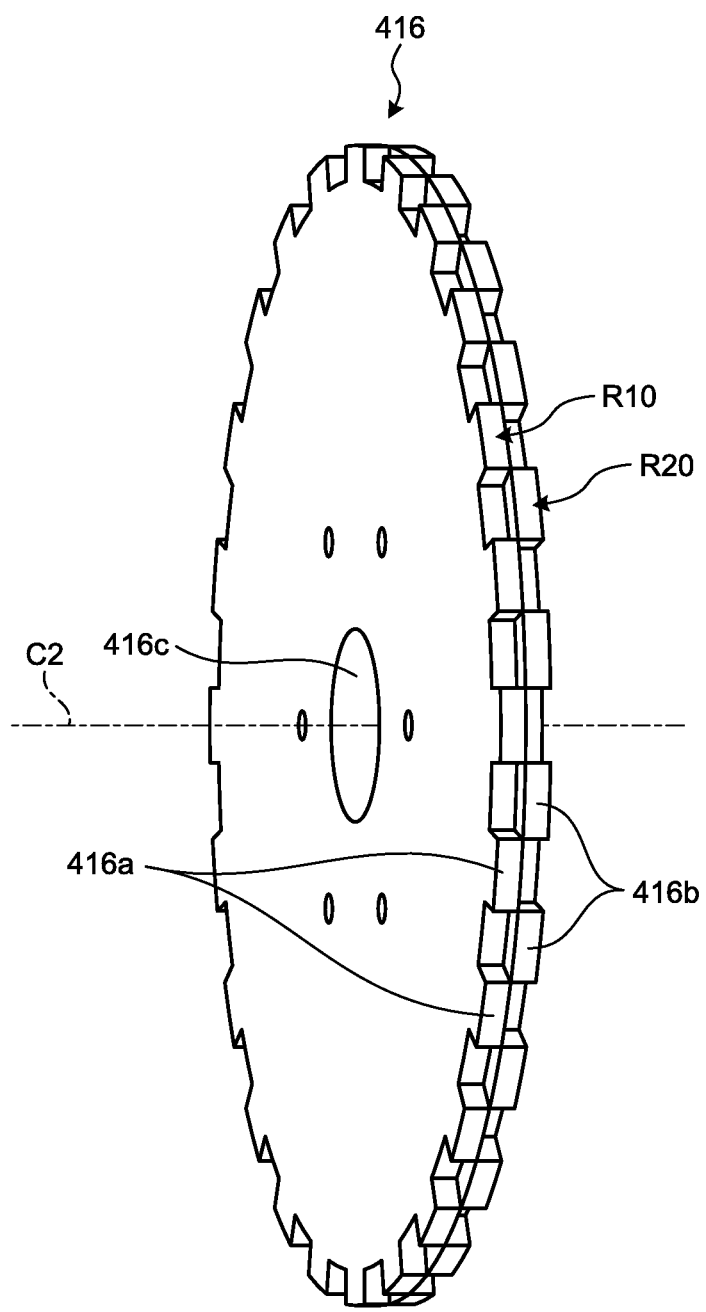
FIG. 9 is a perspective view illustrating a second roller electrode of FIG. 7.

FIG. 6 is a schematic and exemplary view illustrating the seam welding line 100. FIG. 7 is a schematic and exemplary view illustrating a state where seam welding is performed on the coupling portion 9c of the upper sash 9. FIG. 8 is a perspective view illustrating a first roller electrode 415 of FIG. 7. FIG. 9 is a perspective view illustrating a second roller electrode 416 of FIG. 7.

As illustrated in FIG. 6, the seam welding line 100 is provided with a coil 200 that the long metal sheet 201 is wound, a roll forming device 300 that bends the metal sheet 201 sent from the coil 200 a plurality of times, a seam welding device 400 that performs seam welding on the coupling portion 9c (welding target portion) of the upper sash 9 obtained by bending by the roll forming device 300, and a bending device 500 that corrects deformation and distortion of the upper sash 9 caused by the welding heat at the time of seam welding. In the roll forming device 300, a plurality of upper-side roll dies 301 and a plurality of lower-side roll dies 302 provided under the upper-side roll dies 301 are provided.

As illustrated in FIG. 7 to FIG. 9, the seam welding device 400 used for seam welding is provided with the first roller electrode 415 that is arranged on the upper side and the second roller electrode 416 that is arranged on the lower side. As illustrated in FIG. 8, the first roller electrode 415 includes a first row R1 of a plurality of first projecting portions 415a that are arranged at intervals in the circumferential direction around a first rotational center C1 and a second row R2 of a plurality of second projecting portions 415b that are in locations shifted toward one side (right-hand direction in FIG. 8 in the present embodiment) in the axial direction of the first rotational center C1 from the first row R1 and arranged at intervals in the circumferential direction around the first rotational center C1. The first projecting portions 415a and the second projecting portions 415b are arranged alternately along the circumferential direction. The first projecting portions 415a and the second projecting portions 415b come in contact with the welding target portion at the time of seam welding. At the central portion in the radial direction of the first roller electrode 415, a circular central through hole 415c is provided. The central through hole 415c is retained by insertion of a drive shaft not depicted, and by rotating the drive shaft, the first roller electrode 415 is rotated about the first rotational center C1.

As illustrated in FIG. 9, the second roller electrode 416 includes a first opposing row R10 of a plurality of first opposing projecting portions 416a that are arranged at intervals in the circumferential direction around a second rotational center C2 and a second opposing row R20 of a plurality of second opposing projecting portions 416b that are in locations shifted toward one side (right-hand direction in FIG. 9 in the present embodiment) in the axial direction of the second rotational center C2 from the first opposing row R10 and arranged at intervals in the circumferential direction around the second rotational center C2. The first opposing projecting portions 416a and the second opposing projecting portions 416b are arranged alternately along the circumferential direction. The first opposing projecting portions 416a and the second opposing projecting portions 416b come in contact with the welding target portion at the time of seam welding. At the central portion in the radial direction of the second roller electrode 416, a circular central through hole 416c is provided. The central through hole 416c is retained by insertion of a drive shaft not depicted, and by rotating the drive shaft, the second roller electrode 416 is rotated about the second rotational center C2 in conjunction with the first roller electrode 415. The first rotational center C1 and the second rotational center C2 are arranged in parallel.

Each of the first opposing projecting portions 416a is configured so as to face the first projecting portion 415a when the second roller electrode 416 is rotated in conjunction (in synchronization) with the first roller electrode 415. Each of the second opposing projecting portions 416b is configured so as to face the second projecting portion 415b when the second roller electrode 416 is rotated in conjunction with the first roller electrode 415.

Next, the procedure of seam welding will be briefly described.

As illustrated in FIG. 7 to FIG. 9, in the first roller electrode 415 and the second roller electrode 416 first, one of the first projecting portions 415a and one of the first opposing projecting portions 416a that face each other clamp the coupling portion 9c (welding target portion) including a plurality of overlapped metal sheets out of the regions of the upper sash 9 (vehicle door sash). In this state, by applying electricity between the first roller electrode 415 and the second roller electrode 416, seam welding is performed. By this seam welding, a first welded portion P1 illustrated in FIG. 5 is provided. (first process)

Then, by further rotating the first roller electrode 415 and the second roller electrode 416 in conjunction, the first roller electrode 415 and the second roller electrode 416 are made into a state where the coupling portion 9c is clamped by one of the second projecting portions 415b and one of the second opposing projecting portions 416b that face each other. In this state, by applying electricity between the first roller electrode 415 and the second roller electrode 416, seam welding is performed. By this seam welding, a second welded portion P2 illustrated in FIG. 5 is provided. (third process)

Subsequently, by further rotating the first roller electrode 415 and the second roller electrode 416 in conjunction, the first roller electrode 415 and the second roller electrode 416 are made into a state where the coupling portion 9c is clamped by another one of the first projecting portions 415a and another one of the first opposing projecting portions 416a that face each other. In this state, by applying electricity between the first roller electrode 415 and the second roller electrode 416, seam welding is performed. By this seam welding, a third welded portion P3 illustrated in FIG. 5 is provided. (second process)

Moreover, by further rotating the first roller electrode 415 and the second roller electrode 416 in conjunction, the first roller electrode 415 and the second roller electrode 416 are made into a state where the coupling portion 9c is clamped by another one of the second projecting portions 415b and another one of the second opposing projecting portions 416b that face each other. In this state, by applying electricity between the first roller electrode 415 and the second roller electrode 416, seam welding is performed. By this seam welding, a fourth welded portion P4 illustrated in FIG. 5 is provided. (fourth process)

When further rotating the first roller electrode 415 and the second roller electrode 416 in conjunction, as with the foregoing first process, by one of the first projecting portions 415a and one of the first opposing projecting portions 416a that face each other, seam welding is performed on the coupling portion 9c. By this seam welding, a fifth welded portion P5 illustrated in FIG. 5 is provided. As just described, by further rotating the first roller electrode 415 and the second roller electrode 416 in conjunction, such as the fifth welded portion P5, a sixth welded portion P6, a seventh welded portion P7, and an eighth welded portion P8 illustrated in FIG. 5, a plurality of welded portions disposed alternately on the left and right are consecutively provided. The first welding points W1 described later include the first welded portion P1, the third welded portion P3, the fifth welded portion P5, the seventh welded portion P7, and a plurality of subsequent welded portions. The second welding points W2 described later include the second welded portion P2, the fourth welded portion P4, the sixth welded portion P6, the eighth welded portion P8, and a plurality of subsequent welded portions.

As illustrated in FIG. 7, when rotating the first roller electrode 415 and the second roller electrode 416 in the arrow directions, the upper sash 9 moves in a P direction. The seam welding is a welding method by which two metal sheets in the coupling portion 9c are joined, as the metal sheets are melted by the electrical resistance heat (Joule heat) generated in the coupling portion 9c where the metal sheets are overlapped, and as the molten portion is solidified by cooling.

As in the foregoing, in the present embodiment, for example, with the first roller electrode 415 including a plurality of first projecting portions 415a and the second projecting portions 415b that are at intervals in the circumferential direction around the first rotational center C1 and the second roller electrode 416 rotating in conjunction with the first roller electrode 415, by clamping the coupling portion 9c (welding target portion) of the upper sash 9 and applying electricity while rotating, seam welding is performed. Accordingly, in the upper sash 9 according to the present embodiment, a plurality of welded portions are disposed at intervals along the longitudinal direction. Thus, distortion due to the welding heat is reduced in the door sash according to the present embodiment as compared with a conventional door sash for which the welded portion is continuous in a belt-like shape along the longitudinal direction.

In the present embodiment, the second roller electrode 416 is provided with the first opposing row R10 including the first opposing projecting portions 416a that are arranged at intervals in the circumferential direction around the second rotational center C2 parallel with the first rotational center C1 and face the respective first projecting portions 415a when rotated in conjunction with the first roller electrode 415, and the second opposing row R20 including the second opposing projecting portions 416b that are in locations shifted toward one side in the axial direction of the second rotational center C2 from the first opposing row R10, are arranged at intervals in the circumferential direction around the second rotational center C2, and face the respective second projecting portions 415b when rotated in conjunction with the first roller electrode 415. As just described, the second roller electrode 416 includes the first opposing projecting portions 416a facing the first projecting portions 415a, and the second opposing projecting portions 416b facing the second projecting portions 415b.

Furthermore, the seam welding method according to the present embodiment includes the first process in which the seam welding is performed by applying electricity between the first roller electrode 415 and the second roller electrode 416 in a state where the coupling portion 9c (welding target portion) out of the regions of the upper sash 9 is clamped by one of the first projecting portions 415a and one of the first opposing projecting portions 416a that face each other, the second process in which the seam welding is performed by applying electricity between the first roller electrode 415 and the second roller electrode 416 in a state where the coupling portion 9c is clamped by another one of the first projecting portions 415a and another one of the first opposing projecting portions 416a that face each other, the third process in which the seam welding is performed by applying electricity between the first roller electrode 415 and the second roller electrode 416 in a state where the coupling portion 9c (welding target portion) is clamped by one of the second projecting portions 415b and one of the second opposing projecting portions 416b that face each other, and the fourth process in which the seam welding is performed by applying electricity between the first roller electrode 415 and the second roller electrode 416 in a state where the coupling portion 9c (welding target portion) is clamped by another one of the second projecting portions 415b and another one of the second opposing projecting portions 416b that face each other.

From the above, in the present embodiment, in performing the seam welding, it is possible to reliably clamp the coupling portion 9c (welding target portion) by the first projecting portions 415a and the first opposing projecting portions 416a, and to reliably clamp the coupling portion 9c (welding target portion) by the second projecting portions 415b and the second opposing projecting portions 416b. Accordingly, in providing a plurality of welded portions disposed at intervals along the longitudinal direction, weld penetration of base materials at the welded portions is improved.

As illustrated in FIGS. 8 and 9, the first projecting portions 415a and the second projecting portions 415b in the first roller electrode 415 are located alternately along the circumferential direction and the first opposing projecting portions 416a and the second opposing projecting portions 416b in the second roller electrode 416 are located alternately along the circumferential direction. Accordingly, as illustrated in FIGS. 4 and 5, the first welding points W1 and the second welding points W2 are disposed alternately along the vehicle front-and-rear direction (longitudinal direction). Thus, when viewing a cross-section of the vehicle width direction, the joint strength of the coupling portion 9c at each region in the vehicle front-and-rear direction is made uniform. As a result, the strength of the whole upper sash 9 is improved as compared with the case where the first welding points W1 and the second welding points W2 are aligned in the vehicle width direction. Because the first welding points W1 and the second welding points W2 are arranged at equal intervals along the vehicle front-and-rear direction, the distortion that arises in welding the first end portion 9d and the distortion that arises in welding the second end portion 9e cancel out alternately, and in the whole of the upper sash 9, the distortion due to the welding heat is further reduced.

While the embodiment of the present invention has been exemplified in the foregoing, the above-described embodiment is a mere example and is not intended to limit the scope of the invention. The present invention can be implemented in various other forms, and without departing from the scope of the invention, various omissions, substitutions, combinations, and modifications can be made. Those various embodiments and the modifications thereof would fall within the scope and spirit of the invention and would fall within the scope of the invention stated in the appended claims and the scope of the equivalents thereof. In addition, the specifications such as the respective configurations and shapes (the structure, type, direction, shape, size, length, width, thickness, height, number, arrangement, position, material, and the like) can be implemented by changing as appropriate.

Figure 10:
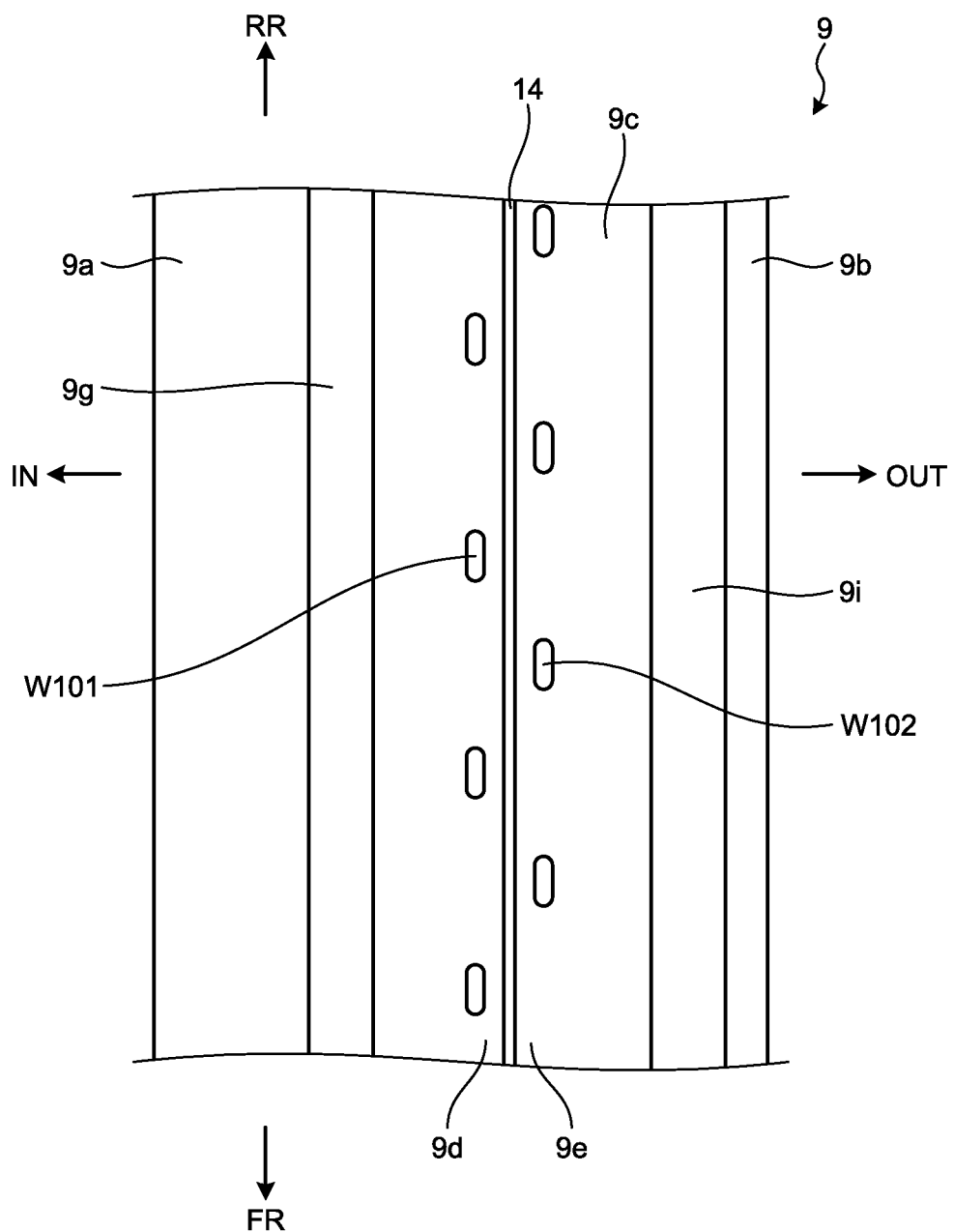
FIG. 10 is a plan view of an upper sash according to a modification.

For example, in the foregoing embodiment, the first welding points W1 and the second welding points W2 have both been in a circular shape. However, like first welding points W101 and second welding points W102 illustrated in FIG. 10, the shape may be a rectangular shape or an oval shape that is elongated along the vehicle front-and-rear direction. In the case of this modification, the length of the circumferential direction of the first projecting portions, the second projecting portions, the first opposing projecting portions, and the second opposing projecting portions of the roller electrodes is longer than the length of the circumferential direction of the first projecting portions 415a, the second projecting portions 415b, the first opposing projecting portions 416a, and the second opposing projecting portions 416b illustrated in FIGS. 8 and 9.

In the present embodiment, the coupling portion 9c of the upper sash 9 of the rear door 3 has been the welding target portion. However, the welding target portion may be a coupling portion of the front side sash 7 or a coupling portion of the rear side sash 8 illustrated in FIG. 1.

Moreover, for example, the outer circumferential surface of the roller electrode of the lower side may be a smooth surface on which no projecting portions are provided. That is, as the roller electrode of the lower side, a roller electrode whose surface along the circumferential direction around the second rotational center C2 parallel with the first rotational center C1 is a smooth surface may be used. In this case, the first roller electrode 415 including the first projecting portions 415a and the second projecting portions 415b is arranged on the upper side and the roller electrode having a smooth surface is arranged on the lower side. In such a case, even when the rotation angle of the first roller electrode 415 of the upper side and the rotation angle of the roller electrode of the lower side are slightly deviated, the outer circumferential surface of the roller electrode of the lower side is brought into contact with the welding target portion at all times, and thus an effect that the current from the first projecting portions 415a and the second projecting portions 415b in the first roller electrode 415 of the upper side is reliably applied to the roller electrode of the lower side via the welding target portion is produced.

In the seam welding method for a vehicle door sash according to the present invention, for example, seam welding is performed, with the first roller electrode including the first projecting portions and the second projecting portions that are at intervals in the circumferential direction around the first rotational center and the second roller electrode rotating in conjunction with the first roller electrode, by clamping the welding target portion of the door sash and applying electricity while rotating. Accordingly, in the door sash according to the present invention, a plurality of welded portions are disposed at intervals along the longitudinal direction. Thus, distortion due to the welding heat is reduced in the door sash according to the present invention as compared with a conventional door sash for which the welded portion is continuous in a belt-like shape along the longitudinal direction.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A seam welding method for a vehicle door sash, the seam welding method comprising
performing seam welding by applying electricity between a first roller electrode and a second roller electrode in a state where a welding target portion is clamped by the first roller electrode and the second roller electrode rotating in conjunction with the first roller electrode, the welding target portion including a plurality of overlapped metal sheets out of regions of the vehicle door sash, the first roller electrode including a first row of a plurality of first projecting portions that are arranged at intervals in a circumferential direction around a first rotational center and a second row of a plurality of second projecting portions that are in locations shifted toward one side in an axial direction of the first rotational center from the first row and arranged at intervals in the circumferential direction around the first rotational center,
wherein the second roller electrode includes a first opposing row including a plurality of first opposing projecting portions that are arranged at intervals in a circumferential direction around a second rotational center parallel with the first rotational center and face the respective first projecting portions when rotated in conjunction with the first roller electrode, and a second opposing row including a plurality of second opposing projecting portions that are in locations shifted toward one side in an axial direction of the second rotational center from the first opposing row, are arranged at intervals in the circumferential direction around the second rotational center, and face the respective second projecting portions when rotated in conjunction with the first roller electrode.

2. The seam welding method for a vehicle door sash according to claim 1, the seam welding method comprising:
a first process in which, by a seam welding device that includes the first roller electrode and the second roller electrode, seam welding is performed by applying electricity between the first roller electrode and the second roller electrode in a state where a welding target portion including a plurality of overlapped metal sheets out of regions of the vehicle door sash is clamped by one of the first projecting portions and one of the first opposing projecting portions that face each other;
a second process in which, by the seam welding device, seam welding is performed by applying electricity between the first roller electrode and the second roller electrode in a state where the welding target portion is clamped by another one of the first projecting portions and another one of the first opposing projecting portions that face each other;
a third process in which, by the seam welding device, seam welding is performed by applying electricity between the first roller electrode and the second roller electrode in a state where the welding target portion is clamped by one of the second projecting portions and one of the second opposing projecting portions that face each other; and
a fourth process in which, by the seam welding device, seam welding is performed by applying electricity between the first roller electrode and the second roller electrode in a state where the welding target portion is clamped by another one of the second projecting portions and another one of the second opposing projecting portions that face each other.

3. The seam welding method for a vehicle door sash according to claim 1, wherein the first projecting portions and the second projecting portions in the first roller electrode are located alternately along the circumferential direction and the first opposing projecting portions and the second opposing projecting portions in the second roller electrode are located alternately along the circumferential direction.

* * * * *